(12) United States Patent
Borchers et al.

(10) Patent No.: US 8,639,871 B2
(45) Date of Patent: *Jan. 28, 2014

(54) PARTITIONING A FLASH MEMORY DATA STORAGE DEVICE

(75) Inventors: Albert T. Borchers, Santa Cruz, CA (US); Andrew T. Swing, Los Gatos, CA (US); Robert S. Sprinkle, Mountain View, CA (US)

(73) Assignee: Google Inc., Mountain View, CA (US)

( * ) Notice: Subject to any disclaimer, the term of this patent is extended or adjusted under 35 U.S.C. 154(b) by 572 days.

This patent is subject to a terminal disclaimer.

(21) Appl. No.: 12/537,741

(22) Filed: Aug. 7, 2009

(65) Prior Publication Data

US 2010/0262761 A1 Oct. 14, 2010

Related U.S. Application Data

(60) Provisional application No. 61/187,835, filed on Jun. 17, 2009, provisional application No. 61/167,709, filed on Apr. 8, 2009.

(51) Int. Cl.
*G06F 12/00* (2006.01)
*G06F 12/02* (2006.01)

(52) U.S. Cl.
USPC .... 711/103; 711/114; 711/173; 711/E12.001; 711/E12.002; 711/E12.008

(58) Field of Classification Search
None
See application file for complete search history.

(56) References Cited

U.S. PATENT DOCUMENTS

| | | | |
|---|---|---|---|
| 4,449,182 A | 5/1984 | Rubinson et al. |
| 4,777,595 A | 10/1988 | Strecker et al. |
| 5,137,118 A | 8/1992 | Iwata |
| 5,535,416 A | 7/1996 | Feeney et al. |
| 5,619,687 A | 4/1997 | Langan et al. |
| 5,708,814 A | 1/1998 | Short et al. |
| 5,802,345 A | 9/1998 | Matsunami et al. |
| 5,844,776 A | 12/1998 | Yamaguchi et al. |
| 5,941,998 A | 8/1999 | Tillson |

(Continued)

FOREIGN PATENT DOCUMENTS

| | | |
|---|---|---|
| EP | 1736885 A2 | 12/2006 |
| JP | 02-292798 A | 12/1990 |

(Continued)

OTHER PUBLICATIONS

International Search Report and Written Opinion received for PCT Application No. PCT/US10/29677, mailed on Jul. 5, 2010, 13 pages.

(Continued)

*Primary Examiner* — Kevin Verbrugge
(74) *Attorney, Agent, or Firm* — Brake Hughes Bellermann LLP

(57) ABSTRACT

A method of partitioning a data storage device that has a plurality of memory chips includes determining a number memory chips in the data storage device, defining, via a host coupled to the data storage device, a first partition of the data storage device, where the first partition includes a first subset of the plurality of memory chips, defining a second partition of the data storage device via the host where the second partition includes a second subset of the plurality of memory chips, such that the first subset does not include any memory chips of the second subset and wherein the second subset does not include any memory chips of the first subset.

23 Claims, 6 Drawing Sheets

(56) References Cited

U.S. PATENT DOCUMENTS

| | | | |
|---|---|---|---|
| 6,003,112 A | 12/1999 | Tetrick | |
| 6,009,478 A | 12/1999 | Panner et al. | |
| 6,167,338 A | 12/2000 | De Wille et al. | |
| 6,172,676 B1 | 1/2001 | Wood | |
| 6,343,660 B1 | 2/2002 | Mutsaers | |
| 6,640,274 B1 | 10/2003 | Huffman et al. | |
| 6,640,290 B1 | 10/2003 | Forin et al. | |
| 6,678,463 B1 | 1/2004 | Pierre et al. | |
| 6,697,284 B2 | 2/2004 | Marotta | |
| 6,757,797 B1 | 6/2004 | Kaiya et al. | |
| 6,781,914 B2* | 8/2004 | Ha | 365/230.03 |
| 6,854,022 B1 | 2/2005 | Thelin | |
| 6,868,007 B2 | 3/2005 | Hasegawa et al. | |
| 6,901,461 B2 | 5/2005 | Bennett | |
| 6,931,498 B2* | 8/2005 | Talreja et al. | 711/154 |
| 6,938,188 B1 | 8/2005 | Kelleher | |
| 6,982,919 B2 | 1/2006 | Kumahara et al. | |
| 7,000,245 B1 | 2/2006 | Pierre et al. | |
| 7,012,632 B2 | 3/2006 | Freeman et al. | |
| 7,024,695 B1 | 4/2006 | Kumar et al. | |
| 7,028,137 B2 | 4/2006 | Nashimoto et al. | |
| 7,080,245 B2 | 7/2006 | Ballard et al. | |
| 7,080,377 B2 | 7/2006 | Peled et al. | |
| 7,088,387 B1 | 8/2006 | Freeman et al. | |
| 7,114,051 B2 | 9/2006 | Guu et al. | |
| 7,127,549 B2 | 10/2006 | Sinclair | |
| 7,127,551 B2 | 10/2006 | Beck | |
| 7,158,167 B1 | 1/2007 | Yerazunis et al. | |
| 7,159,104 B2* | 1/2007 | Dewey | 713/1 |
| 7,161,834 B2 | 1/2007 | Kumahara et al. | |
| 7,225,289 B2 | 5/2007 | Tee et al. | |
| 7,296,213 B2 | 11/2007 | Vainsencher et al. | |
| 7,310,699 B2 | 12/2007 | Sinclair | |
| 7,325,104 B2* | 1/2008 | Satori et al. | 711/150 |
| 7,328,304 B2 | 2/2008 | Royer, Jr. et al. | |
| 7,356,637 B2 | 4/2008 | Tee et al. | |
| 7,370,230 B1 | 5/2008 | Flake | |
| 7,392,367 B2 | 6/2008 | Clark et al. | |
| 7,406,572 B1 | 7/2008 | Nguyen | |
| 7,546,393 B2 | 6/2009 | Day et al. | |
| 7,562,366 B2 | 7/2009 | Pope et al. | |
| 7,610,443 B2 | 10/2009 | Huang | |
| 7,631,084 B2 | 12/2009 | Thomas et al. | |
| 7,660,306 B1 | 2/2010 | Eriksson et al. | |
| 7,668,177 B1 | 2/2010 | Trapp et al. | |
| 7,730,257 B2 | 6/2010 | Franklin | |
| 7,836,378 B2 | 11/2010 | Shaeffer et al. | |
| 7,865,809 B1 | 1/2011 | Lee et al. | |
| 7,904,639 B2 | 3/2011 | Kim et al. | |
| 7,934,055 B2 | 4/2011 | Flynn et al. | |
| 8,037,234 B2 | 10/2011 | Yu et al. | |
| 8,051,253 B2* | 11/2011 | Okin et al. | 711/154 |
| 8,086,936 B2 | 12/2011 | Gower et al. | |
| 8,205,037 B2 | 6/2012 | Swing et al. | |
| 8,239,713 B2 | 8/2012 | Borchers et al. | |
| 8,239,724 B2 | 8/2012 | Swing et al. | |
| 8,239,729 B2 | 8/2012 | Borchers et al. | |
| 8,244,962 B2 | 8/2012 | Swing et al. | |
| 8,250,271 B2 | 8/2012 | Swing et al. | |
| 8,327,220 B2 | 12/2012 | Borchers et al. | |
| 8,380,909 B2 | 2/2013 | Borchers et al. | |
| 2001/0023472 A1 | 9/2001 | Kubushiro et al. | |
| 2002/0005895 A1 | 1/2002 | Freeman et al. | |
| 2002/0053004 A1 | 5/2002 | Pong | |
| 2002/0078285 A1 | 6/2002 | Hofstee et al. | |
| 2002/0144066 A1* | 10/2002 | Talreja et al. | 711/154 |
| 2002/0178307 A1* | 11/2002 | Pua et al. | 710/62 |
| 2003/0039140 A1* | 2/2003 | Ha | 365/185.11 |
| 2003/0058689 A1 | 3/2003 | Marotta | |
| 2003/0101327 A1 | 5/2003 | Beck | |
| 2003/0117846 A1 | 6/2003 | Hasegawa et al. | |
| 2003/0208771 A1 | 11/2003 | Hensgen et al. | |
| 2003/0221092 A1 | 11/2003 | Ballard et al. | |
| 2003/0225960 A1 | 12/2003 | Guu et al. | |
| 2004/0049649 A1 | 3/2004 | Durrant | |
| 2004/0078729 A1 | 4/2004 | Peter | |
| 2004/0236933 A1* | 11/2004 | Dewey | 713/1 |
| 2005/0041509 A1 | 2/2005 | Kumahara et al. | |
| 2005/0172067 A1 | 8/2005 | Sinclair | |
| 2005/0172087 A1 | 8/2005 | Klingman | |
| 2005/0177698 A1 | 8/2005 | Ku et al. | |
| 2005/0193164 A1 | 9/2005 | Royer et al. | |
| 2006/0053308 A1 | 3/2006 | Zimmerman | |
| 2006/0062052 A1 | 3/2006 | Kumahara et al. | |
| 2006/0123284 A1 | 6/2006 | Hwang et al. | |
| 2006/0184758 A1* | 8/2006 | Satori et al. | 711/168 |
| 2006/0206653 A1 | 9/2006 | Tee et al. | |
| 2007/0008801 A1 | 1/2007 | Chiang et al. | |
| 2007/0028040 A1 | 2/2007 | Sinclair | |
| 2007/0101238 A1 | 5/2007 | Resnick et al. | |
| 2007/0113150 A1 | 5/2007 | Resnick et al. | |
| 2007/0198796 A1 | 8/2007 | Warren, Jr. | |
| 2007/0208900 A1 | 9/2007 | Tee et al. | |
| 2007/0255890 A1 | 11/2007 | Urata et al. | |
| 2007/0255981 A1 | 11/2007 | Eto | |
| 2007/0288686 A1 | 12/2007 | Arcedera et al. | |
| 2007/0288692 A1 | 12/2007 | Bruce et al. | |
| 2008/0010431 A1 | 1/2008 | Chang et al. | |
| 2008/0022186 A1 | 1/2008 | Co et al. | |
| 2008/0040531 A1 | 2/2008 | Anderson | |
| 2008/0049520 A1 | 2/2008 | Kang et al. | |
| 2008/0052448 A1 | 2/2008 | Minz et al. | |
| 2008/0052449 A1 | 2/2008 | Kim et al. | |
| 2008/0052451 A1 | 2/2008 | Pua et al. | |
| 2008/0059747 A1 | 3/2008 | Burckart et al. | |
| 2008/0065815 A1* | 3/2008 | Nasu et al. | 711/103 |
| 2008/0077727 A1 | 3/2008 | Baca et al. | |
| 2008/0091915 A1 | 4/2008 | Moertl et al. | |
| 2008/0126658 A1 | 5/2008 | Wang | |
| 2008/0147931 A1 | 6/2008 | McDaniel et al. | |
| 2008/0155160 A1 | 6/2008 | McDaniel | |
| 2008/0163030 A1 | 7/2008 | Lee | |
| 2008/0178025 A1 | 7/2008 | Hand et al. | |
| 2008/0209157 A1 | 8/2008 | Weng | |
| 2008/0222491 A1 | 9/2008 | Lee et al. | |
| 2008/0235467 A1 | 9/2008 | Tagawa | |
| 2008/0288814 A1 | 11/2008 | Kitahara | |
| 2008/0294814 A1 | 11/2008 | Gorobets | |
| 2008/0301349 A1 | 12/2008 | Bacha | |
| 2008/0301381 A1 | 12/2008 | Lee et al. | |
| 2008/0320214 A1* | 12/2008 | Ma et al. | 711/103 |
| 2009/0006720 A1 | 1/2009 | Traister | |
| 2009/0037652 A1* | 2/2009 | Yu et al. | 711/103 |
| 2009/0044078 A1 | 2/2009 | Vogan et al. | |
| 2009/0055590 A1 | 2/2009 | Takahashi | |
| 2009/0063922 A1 | 3/2009 | Gower et al. | |
| 2009/0063934 A1 | 3/2009 | Jo | |
| 2009/0119443 A1 | 5/2009 | Tremaine | |
| 2009/0125785 A1 | 5/2009 | Gorobets et al. | |
| 2009/0125790 A1 | 5/2009 | Iyer et al. | |
| 2009/0164698 A1* | 6/2009 | Ji et al. | 711/100 |
| 2009/0240873 A1 | 9/2009 | Yu et al. | |
| 2009/0265513 A1 | 10/2009 | Ryu | |
| 2010/0049914 A1* | 2/2010 | Goodwin | 711/114 |
| 2010/0153660 A1 | 6/2010 | Lasser et al. | |
| 2010/0211737 A1 | 8/2010 | Flynn et al. | |
| 2010/0262738 A1 | 10/2010 | Swing et al. | |
| 2010/0262740 A1 | 10/2010 | Borchers et al. | |
| 2010/0262757 A1 | 10/2010 | Sprinkle et al. | |
| 2010/0262758 A1 | 10/2010 | Swing et al. | |
| 2010/0262759 A1 | 10/2010 | Borchers et al. | |
| 2010/0262760 A1 | 10/2010 | Swing et al. | |
| 2010/0262762 A1 | 10/2010 | Borchers et al. | |
| 2010/0262766 A1 | 10/2010 | Sprinkle et al. | |
| 2010/0262767 A1 | 10/2010 | Borchers et al. | |
| 2010/0262773 A1 | 10/2010 | Borchers et al. | |
| 2010/0262894 A1 | 10/2010 | Swing et al. | |
| 2010/0262979 A1 | 10/2010 | Borchers et al. | |
| 2010/0269015 A1 | 10/2010 | Borchers et al. | |
| 2010/0287217 A1 | 11/2010 | Borchers et al. | |
| 2011/0191554 A1 | 8/2011 | Sakai | |
| 2011/0213921 A1 | 9/2011 | Yu et al. | |
| 2011/0238885 A1 | 9/2011 | Kitahara et al. | |

(56) References Cited

U.S. PATENT DOCUMENTS

| | | |
|---|---|---|
| 2012/0030416 A1 | 2/2012 | Borchers et al. |
| 2012/0030507 A1 | 2/2012 | Borchers et al. |
| 2012/0030542 A1 | 2/2012 | Borchers et al. |

FOREIGN PATENT DOCUMENTS

| | | |
|---|---|---|
| JP | 07-311661 A | 11/1995 |
| JP | 10-214221 A | 8/1998 |
| JP | 2004-071033 | 3/2004 |
| JP | 2008-102819 A | 5/2008 |
| WO | 01/33852 A1 | 5/2001 |
| WO | 01/90900 A1 | 11/2001 |
| WO | 02/11424 A2 | 2/2002 |
| WO | 02/058383 A1 | 7/2002 |
| WO | 2005/081097 A2 | 9/2005 |
| WO | 2005/093588 A2 | 10/2005 |
| WO | 2005/081097 A3 | 11/2005 |
| WO | 2005/093588 A3 | 12/2006 |
| WO | 2007/072313 A2 | 6/2007 |
| WO | 2007/072317 A2 | 6/2007 |
| WO | 2007/072317 A3 | 6/2007 |
| WO | 2007/096844 A2 | 8/2007 |
| WO | 2007/096844 A3 | 8/2007 |
| WO | 2007/146756 A2 | 12/2007 |
| WO | 2007/146845 A2 | 12/2007 |
| WO | 2008/022094 A2 | 2/2008 |
| WO | 2008/040028 A2 | 4/2008 |
| WO | 2008/025238 A1 | 6/2008 |
| WO | 2008/147752 A1 | 12/2008 |
| WO | 2010/117928 A1 | 10/2010 |
| WO | 2010/117929 A1 | 10/2010 |
| WO | 2010/117930 A1 | 10/2010 |

OTHER PUBLICATIONS

International Search Report and Written Opinion received for PCT Application No. PCT/US10/29679, mailed on Jul. 5, 2010, 20 pages.
International Search Report and Written Opinion received for PCT Application No. PCT/US2010/029916, mailed on Jul. 7, 2010, 14 pages.
International Search Report and Written Opinion received for PCT Application No. PCT/US2010/029917, mailed on Jul. 28, 2010, 19 pages.
International Search Report and Written Opinion received for PCT Application No. PCT/US2010/029919, mailed on Jul. 28, 2010, 11 pages.
International Search Report and Written Opinion received for PCT Application No. PCT/US2010/030389, mailed on Jul. 21, 2010, 11 pages.
U.S. Appl. No. 12/537,733, filed on Aug. 7, 2009.
U.S. Appl. No. 12/537,727, filed on Aug. 7, 2009.
U.S. Appl. No. 12/537,725, filed on Aug. 7, 2009.
U.S. Appl. No. 12/537,722, filed on Aug. 7, 2009.
U.S. Appl. No. 12/537,719, filed on Aug. 7, 2009.
U.S. Appl. No. 12/756,009, filed on Apr. 7, 2010, 35 pages.
U.S. Appl. No. 12/537,709, filed on Aug. 7, 2009.
U.S. Appl. No. 12/755,964, filed on Apr. 7, 2010, 44 pages.
U.S. Appl. No. 12/537,738, filed on Aug. 7, 2009.
U.S. Appl. No. 12/756,477, filed on Apr. 8, 2010, 51 pages.
U.S. Appl. No. 12/537,748, filed on Aug. 7, 2009.
U.S. Appl. No. 12/755,968, filed on Apr. 7, 2010, 41 pages.
U.S. Appl. No. 12/756,007, filed on Apr. 7, 2010, 54 pages.
Office Action Response for U.S. Appl. No. 12/537,727, filed on Mar. 14, 2011, 11 pages.
Office Action for U.S. Appl. No. 12/537,727, mailed on Dec. 13, 2010, 20 pages.
Office Action for U.S. Appl. No. 12/537,727, mailed on Jun. 3, 2011, 15 pages.
Non-Final Office Action for U.S. Appl. No. 12/755,968, mailed Jan. 26, 2012, 32 pages.
Non-Final Office Action for U.S. Appl. No. 13/269,985, mailed Jan. 6, 2012, 24 pages.
Non-Final Office Action for U.S. Appl. No. 12/537,709, mailed Dec. 19, 2011, 28 pages.
Non-Final Office Action for U.S. Appl. No. 12/537,719, mailed Nov. 30, 2011, 29 pages.
Final Office Action for U.S. Appl. No. 12/537,704, mailed Apr. 6, 2012, 15 pages.
Non-Final Office Action for U.S. Appl. No. 12/537,704, mailed Nov. 28, 2011, 24 pages.
Non-Final Office Action for U.S. Appl. No. 12/537,748, mailed Dec. 12, 2011, 24 pages.
Non-Final Office Action Response for U.S. Appl. No. 13/269,183, filed Mar. 27, 2012, 17 pages.
Non-Final Office Action for U.S. Appl. No. 12/537,738, mailed Dec. 12, 2011, 25 pages.
Wen, "A Processor-DMA-Based Memory Copy Hardware Accelerator", 6th IEEE International Conference on Networking, Architecture and Storage (NAS), Jul. 30, 2011, pp. 225-229.
Non-Final Office Action for U.S. Appl. No. 13/269,972, mailed Jan. 5, 2012, 26 pages.
Non-Final Office Action Response for U.S. Appl. No. 12/537,704, filed Feb. 28, 2012, 25 pages.
Non-Final Office Action Response for U.S. Appl. No. 12/537,709, filed Mar. 19, 2012, 25 pages.
Paris, et al, "Evaluating the Impact of Irrecoverable Read Errors on Disk Array Reliability", 15th IEEE Pacific Rim International Symposium on Dependable Computing, Nov. 16-18, 2009, 6 pages.
Takeuchi, "Novel Co-Design of NAND Flash Memory and NAND Flash Controller Circuits for Sub-30 nm Low-Power High-Speed Solid-State Drives (SSD)", IEEE Journal of Solid-State Circuits, vol. 44, No. 4, Apr. 2009, pp. 1227-1234.
Non-Final Office Action Response for U.S. Appl. No. 12/537,719, filed Feb. 29, 2012, 23 pages.
Non-Final Office Action Response for U.S. Appl. No. 12/537,727, filed Aug. 31, 2011, 15 pages.
Non-Final Office Action for U.S. Appl. No. 12/537,727, mailed Nov. 8, 2011, 13 pages.
Non-Final Office Action Response for U.S. Appl. No. 12/537,727, filed Mar. 8, 2012, 22 pages.
Non-Final Office Action for U.S. Appl. No. 12/537,733, mailed Mar. 14, 2012, 23 pages.
Non-Final Office Action for U.S. Appl. No. 13/269,183, mailed Dec. 27, 2011, 27 pages.
Non-Final Office Action Response for U.S. Appl. No. 13/269,972, filed Apr. 4, 2012, 25 pages.
Non-Final Office Action Response for U.S. Appl. No. 13/269,985, filed Apr. 4, 2012, 26 pages.
Notice of Allowance for U.S. Appl. No. 12/537,709, mailed Apr. 6, 2012, 14 pages.
Final Office Action for U.S. Appl. No. 12/537,719, mailed Apr. 9, 2012, 21 pages.
Non-Final Office Action for U.S. Appl. No. 12/537,722, mailed Dec. 19, 2011, 25 pages.
Notice of Allowance for U.S. Appl. No. 12/537,727, mailed Apr. 24, 2012, 14 pages.
Notice of Allowance for U.S. Appl. No. 13/269,183, mailed Apr. 19, 2012, 15 pages.
Non-Final Office Action for U.S. Appl. No. 12/537,725, mailed Jan. 30, 2012, 33 pages.
Notice of Allowance for U.S. Appl. No. 12/537,722, mailed May 11, 2012, 14 pages.
Notice of Allowance for U.S. Appl. No. 12/537,725, mailed May 21, 2012, 18 pages.
Notice of Allowance for U.S. Appl. No. 13/269,972, mailed May 23, 2012, 18 pages.
Non-Final Office Action Response for U.S. Appl. No. 12/537,722, filed Apr. 19, 2012, 12 pages.
Non-Final Office Action Response for U.S. Appl. No. 12/537,725, filed Apr. 27, 2012, 12 pages.
Non-Final Office Action Response for U.S. Appl. No. 12/537,748, filed May 2, 2012, 13 pages.

(56) References Cited

OTHER PUBLICATIONS

Notice of Allowance for U.S. Appl. No. 12/537,704, mailed Jun. 17, 2013, 6 pages.
Final Office Action for U.S. Appl. No. 12/756,477, mailed May 15, 2013, 22 pages.
Final Office Action Response for U.S. Appl. No. 12/537,704, filed Jul. 5, 2012, 23 pages.
Final Office Action Response for U.S. Appl. No. 12/537,719, filed Jul. 9, 2012, 22 pages.
Final Office Action for U.S. Appl. No. 12/537,733, mailed Jul. 9, 2012, 22 pages.
Non-Final Office Action Response for U.S. Appl. No. 12/537,733, filed Jun. 14, 2012, 10 pages.
Final Office Action for U.S. Appl. No. 12/537,748, mailed Jul. 9, 2012, 22 pages.
Office Action for U.S. Appl. No. 12/755,964, mailed Sep. 10, 2012, 31 pages.
Non-Final Office Action for U.S. Appl. No. 12/756,009, mailed Sep. 11, 2012, 31 pages.
Non-Final Office Action for U.S. Appl. No. 12/756,477, mailed Jul. 19, 2012, 38 pages.
Non-Final Office Action for U.S. Appl. No. 13/269,985, mailed Jun. 6, 2012, 19 pages.
Non-Final Office Action Response for U.S. Appl. No. 13/269,985, filed on Sep. 6, 2012, 10 pages.
First Office Action for AU Application No. 2010234647, mailed Oct. 30, 2012, 3 pages.
Notice of Allowance for U.S. Appl. No. 12/537,733, mailed Nov. 27, 2012, 11 pages.
Final Office Action Response and RCE for U.S. Appl. No. 12/537,733, filed Oct. 9, 2012, 12 pages.
Notice of Allowance for U.S. Appl. No. 12/756,009, mailed Jan. 11, 2013, 6 pages.
Non-Final Office Action Response for U.S. Appl. No. 12/756,009, filed Dec. 10, 2012, 7 pages.
Notice of Allowance for U.S. Appl. No. 12/755,964, mailed Jan. 29, 2013, 7 pages.
Non-Final Office Action for U.S. Appl. No. 12/756,007, mailed Feb. 28, 2013, 10 pages.
Office Action Response for U.S. Appl. No. 12/755,964, filed Jan. 4, 2013, 8 pages.
Non-Final Office Action Response for U.S. Appl. No. 12/756,477, filed Jan. 17, 2013, 10 pages.
Working Draft Project, American National Standard, T13/1699-D Revision 4a, Annex E, section E5.2, May 21, 2007, 462 pages.
Office Action for Japanese Application No. 2012-504741 (with English Translation), mailed May 21, 2013, 5 pages.
Notice of Allowance for JP Application No. 2012-504742, mailed Jul. 30, 2013, 3 pages.

* cited by examiner

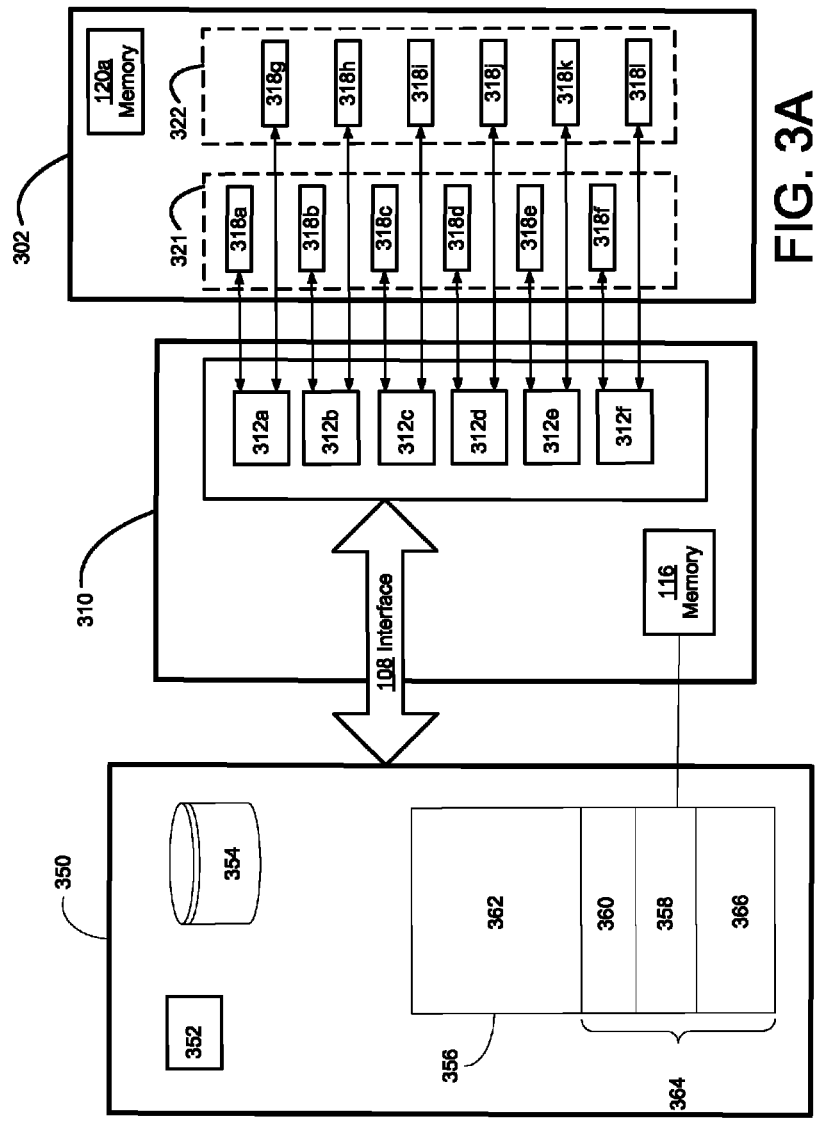

PARTITIONING A FLASH MEMORY DATA STORAGE DEVICE

CROSS REFERENCE TO RELATED APPLICATIONS

This application claims the benefit of U.S. Provisional Application No. 61/167,709, filed Apr. 8, 2009, and titled "Data Storage Device" and U.S. Provisional Application No. 61/187,835, filed Jun. 17, 2009, and titled "Partitioning and Striping in a Flash Memory Data Storage Device," both of which are hereby incorporated by reference in entirety.

TECHNICAL FIELD

This description relates to a data storage device.

BACKGROUND

Data storage devices may be used to store data. A data storage device may be used with a computing device to provide for the data storage needs of the computing device. In certain instances, it may be desirable to store large amounts of data on a data storage device. Also, it may be desirable to execute commands quickly to read data from and to write data to the data storage device.

SUMMARY

According to one general aspect, a method of partitioning a data storage device that includes a plurality of memory chips is disclosed. The method includes determining a number memory chips in the data storage device. A host coupled to the data storage device defines a first partition and a second of the data storage device, where the first partition includes a first subset of the plurality of memory chips and where the second partition includes a second subset of the plurality of memory chips. The first subset does not include any memory chips of the second subset and wherein the second subset does not include any memory chips of the first subset.

In another general aspect, a method of partitioning a data storage device that includes a plurality of memory chips is disclosed, in which a physical configuration of the data storage device, including the number memory chips in the data storage device, and a partitioning scheme for the data storage device are read. A host coupled to the data storage device defines a first partition and a second partition of the data storage device, where the first partition includes a first subset of the plurality of memory chips and the second partition includes a second subset of the plurality of memory chips, and where the first subset does not include any memory chips of the second subset and wherein the second subset does not include any memory chips of the first subset. A logical to physical memory map is allocated for the first partition, and a logical to physical memory map is allocated for the first partition.

Implementations can include one or more of the following features. Data can be written to the first partition while reading data from the second partition. Determining a number memory chips in the data storage device can include transmitting information from the data storage device to the host indicating the number of memory chips in the data storage device. The host can define an address location in the data storage device to which to write data from the host, where the address location specifies that the data be written to a specific one of the plurality of memory chips.

The data storage device can include a plurality of physical channels for communication of data between the host and the plurality of memory chips, each channel being operably connected to a different plurality of the memory chips, and then the number of physical channels can be determined. A first subset and a second subset of the channels can be defined, where channels of the first subset of the channels are operably connected only to memory chips of the first subset of memory chips and where channels of the second subset of the channels are operably connected only to memory chips of the second subset of memory chips. And the host can define an address location in the data storage device to which to write data from the host, where the address location specifies that the data be written to a specific one of the plurality of memory chips through a specific channel. The first partition can include memory chips that are operably connected to a single channel.

The host can re-define the first partition of the data storage device to include a third subset of the plurality of memory chips, where the third subset is different from the first subset, and where the third subset does not include any memory chips of the second subset and where the second subset does not include any memory chips of the third subset. An indication that one of the memory chips in the first subset has failed or is approaching failure can be received, and then re-defining the first partition can include defining the third subset as the first subset of memory chips but for the memory chip that has failed or that is approaching failure.

In another general aspect, an apparatus includes a data storage device that includes a plurality of memory chips, and a host operably coupled to the data storage device via an interface. The host includes a configuration detection engine configured to detect the number of memory chips in the data storage device, and a partition engine. The partition engine is configured to define a first partition of the data storage device, where the first partition includes a first subset of the plurality of memory chips and to define a second partition of the data storage device, where the second partition includes a second subset of the plurality of memory chips, and where the first subset does not include any memory chips of the second subset and where the second subset does not include any memory chips of the first subset.

In another general aspect, an apparatus includes a data storage device that includes a plurality of memory chips, and a host operably coupled to the data storage device via an interface. The host includes a configuration detection engine configured to read a physical configuration of the data storage device, including the number memory chips in the data storage device and configured to read a partitioning scheme for the data storage device. The host also includes a partition engine configured to define a first partition of the data storage device, where the first partition includes a first subset of the plurality of memory chips and to define a second partition of the data storage device, where the second partition includes a second subset of the plurality of memory chips, and configured to allocate a logical to physical memory map for the first partition and to allocate a logical to physical memory map for the second partition. The first subset does not include any memory chips of the second subset, and the second subset does not include any memory chips of the first subset.

Implementations can include one or more of the following features. For example, the data storage device can be configured to transmit, upon receiving a command from the host, information from the data storage device to the host indicating the number of memory chips in the data storage device. The host can also include an address assignment engine configured to assign a memory address to data to be written to the data storage device, where the assigned memory address specifies that the data be written to a specific one of the plurality of memory chips.

The data storage device can include a plurality of physical channels for communication of data between the host and the plurality of memory chips, with each channel being operably connected to a different plurality of the memory chips. Then, the configuration detection engine can be further configured to detect the number of channels in the data storage device, and the partition engine can be further configured to define a first subset of the channels, where channels of the first subset of the channels are operably connected only to memory chips of the first subset of memory chips, and where the partition engine can be further configured to define a second subset of the channels, where channels of the second subset of the channels are operably connected only to memory chips of the second subset of memory chips.

The host can further include an address assignment engine configured to assign a memory address to data to be written to the data storage device, where the assigned memory address specifies that the data be written to a specific one of the plurality of memory chips through a specific channel. The first partition can include memory chips that are operably connected to a single channel. The partition engine can be further configured to re-define the first partition of the data storage device to include a third subset of the plurality of memory chips, where the third subset is different from the first subset, and where the third subset does not include any memory chips of the second subset and wherein the second subset does not include any memory chips of the third subset. The partition engine can be further configured to receive an indication that one of the memory chips in the first subset has failed or is approaching failure; and re-defining the first partition to include the third subset of the plurality of memory chips can include defining the third subset as the first subset of memory chips but for the memory chip that has failed or that is approaching failure.

BRIEF DESCRIPTION OF THE DRAWINGS

FIG. 3A is an exemplary block diagram of exemplary computing devices for use with the data storage device of FIG. 1.

DETAILED DESCRIPTION

This document describes an apparatus, system(s) and techniques for data storage. Such a data storage apparatus may include a controller board having a controller that may be used with one or more different memory boards, with each of the memory boards having multiple flash memory chips. The data storage apparatus may communicate with a host using an interface on the controller board. In this manner, the controller on the controller board may be configured to receive commands from the host using the interface and to execute those commands using the flash memory chips on the memory boards.

Figure 1:
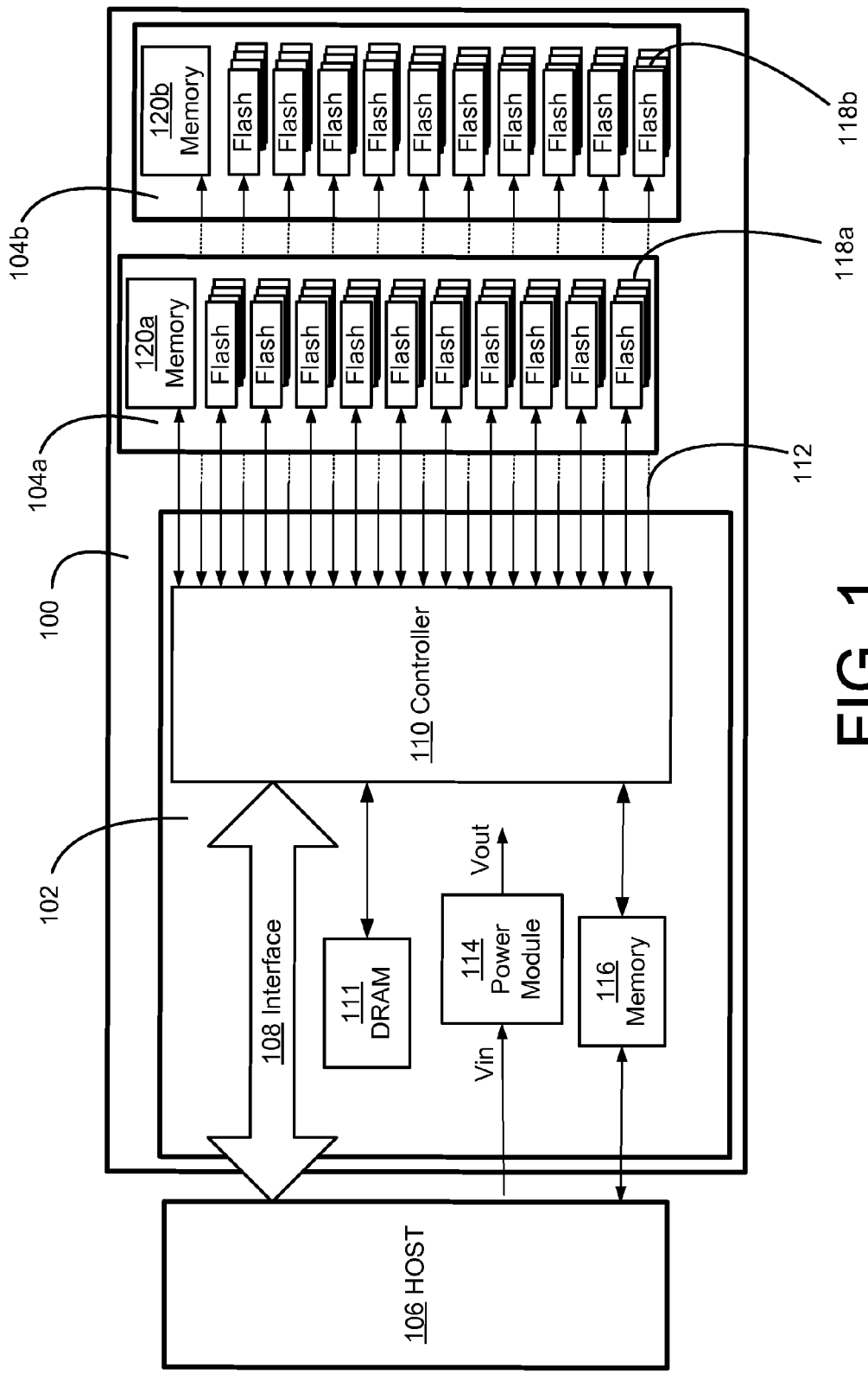
FIG. 1 is an exemplary block diagram of a data storage device.

FIG. 1 is a block diagram of a data storage device 100. The data storage device 100 may include a controller board 102 and one or more memory boards 104a and 104b. The data storage device 100 may communicate with a host 106 over an interface 108. The interface 108 may be between the host 106 and the controller board 102. The controller board 102 may include a controller 110, a DRAM 111, multiple channels 112, a power module 114, and a memory module 116. The memory boards 104a and 104b may include multiple flash memory chips 118a and 118b on each of the memory boards. The memory boards 104a and 104b also may include a memory device 120a and 120b.

In general, the data storage device 100 may be configured to store data on the flash memory chips 118a and 118b. The host 106 may write data to and read data from the flash memory chips 118a and 118b, as well as cause other operations to be performed with respect to the flash memory chips 118a and 118b. The reading and writing of data between the host 106 and the flash memory chips 118a and 118b, as well as the other operations, may be processed through and controlled by the controller 110 on the controller board 102. The controller 110 may receive commands from the host 106 and cause those commands to be executed using the flash memory chips 118a and 118b on the memory boards 104a and 104b. The communication between the host 106 and the controller 110 may be through the interface 108. The controller 110 may communicate with the flash memory chips 118a and 118b using the channels 112.

The controller board 102 may include DRAM 111. The DRAM 111 may be operably coupled to the controller 110 and may be used to store information. For example, the DRAM 111 may be used to store logical address to physical address maps and bad block information. The DRAM 111 also may be configured to function as a buffer between the host 106 and the flash memory chips 118a and 118b.

In one exemplary implementation, the controller board 102 and each of the memory boards 104a and 104b are physically separate printed circuit boards (PCBs). The memory board 104a may be on one PCB that is operably connected to the controller board 102 PCB. For example, the memory board 104a may be physically and/or electrically connected to the controller board 102. Similarly, the memory board 104b may be a separate PCB from the memory board 104a and may be operably connected to the controller board 102 PCB. For example, the memory board 104b may be physically and/or electrically connected to the controller board 102.

The memory boards 104a and 104b each may be separately disconnected and removable from the controller board 102. For example, the memory board 104a may be disconnected from the controller board 102 and replaced with another memory board (not shown), where the other memory board is operably connected to controller board 102. In this example, either or both of the memory boards 104a and 104b may be swapped out with other memory boards such that the other memory boards may operate with the same controller board 102 and controller 110.

In one exemplary implementation, the controller board 102 and each of the memory boards 104a and 104b may be physically connected in a disk drive form factor. The disk drive form factor may include different sizes such as, for example, a 3.5" disk drive form factor and a 2.5" disk drive form factor.

In one exemplary implementation, the controller board 102 and each of the memory boards 104a and 104b may be electrically connected using a high density ball grid array (BGA)

connector. Other variants of BGA connectors may be used including, for example, a fine ball grid array (FBGA) connector, an ultra fine ball grid array (UBGA) connector and a micro ball grid array (MBGA) connector. Other types of electrical connection means also may be used.

The interface 108 may include a high speed interface between the controller 110 and the host 106. The high speed interface may enable fast transfers of data between the host 106 and the flash memory chips 118a and 118b. In one exemplary implementation, the high speed interface may include a Peripheral Component Interconnect Express ("PCIe") interface. For instance, the PCIe interface may be a PCIe x4 interface or a PCIe x8 interface. The PCIe interface 108 may include a PCIe connector cable assembly to the host 106. In this example, the 110 may include an interface controller configured to interface between the host 106 and the interface 108. The interface controller may include a PCIe endpoint controller. Other high speed interfaces, connectors, and connector assemblies also may be used.

In one exemplary implementation, the communication between the controller board 102 and the flash memory chips 118a and 118b on the memory boards 104a and 104b may be arranged and configured into multiple channels 112. Each of the channels 112 may communicate with one or more flash memory chips 118a and 118b. The controller 110 may be configured such that commands received from the host 106 may be executed by the controller 110 using each of the channels 112 simultaneously or at least substantially simultaneously. In this manner, multiple commands may be executed simultaneously on different channels 112, which may improve throughput of the data storage device 100.

In the example of FIG. 1, twenty (20) channels 112 are illustrated. The completely solid lines illustrate the ten (10) channels between the controller 110 and the flash memory chips 118a on the memory board 104a. The mixed solid and dashed lines illustrate the ten (10) channels between the controller 110 and the flash memory chips 118b on the memory board 104b. As illustrated in FIG. 1, each of the channels 112 may support multiple flash memory chips. For instance, each of the channels 112 may support up to 32 flash memory chips. In one exemplary implementation, each of the 20 channels may be configured to support and communicate with 6 flash memory chips. In this example, each of the memory boards 104a and 104b would include 60 flash memory chips each. Depending on the type and the number of the flash memory chips 118a and 118b, the data storage 100 device may be configured to store up to and including multiple terabytes of data.

The controller 110 may include a microcontroller, a FPGA controller, other types of controllers, or combinations of these controllers. In one exemplary implementation, the controller 110 is a microcontroller. The microcontroller may be implemented in hardware, software, or a combination of hardware and software. For example, the microcontroller may be loaded with a computer program product from memory (e.g., memory module 116) including instructions that, when executed, may cause the microcontroller to perform in a certain manner. The microcontroller may be configured to receive commands from the host 106 using the interface 108 and to execute the commands. For instance, the commands may include commands to read, write, copy and erase blocks of data using the flash memory chips 118a and 118b, as well as other commands.

In another exemplary implementation, the controller 110 is a FPGA controller. The FPGA controller may be implemented in hardware, software, or a combination of hardware and software. For example, the FPGA controller may be loaded with firmware from memory (e.g., memory module 116) including instructions that, when executed, may cause the FPGA controller to perform in a certain manner. The FPGA controller may be configured to receive commands from the host 106 using the interface 108 and to execute the commands. For instance, the commands may include commands to read, write, copy and erase blocks of data using the flash memory chips 118a and 118b, as well as other commands.

The memory module 116 may be configured to store data, which may be loaded to the controller 110. For instance, the memory module 116 may be configured to store one or more images for the FPGA controller, where the images include firmware for use by the FPGA controller. The memory module 116 may interface with the host 106 to communicate with the host 106. The memory module 116 may interface directly with the host 106 and/or may interface indirectly with the host 106 through the controller 110. For example, the host 106 may communicate one or more images of firmware to the memory module 116 for storage. In one exemplary implementation, the memory module 116 includes an electrically erasable programmable read-only memory (EEPROM). The memory module 116 also may include other types of memory modules.

The memory boards 104a and 104b may be configured to operate with different types of flash memory chips 118a and 118b. In one exemplary implementation, the flash memory chips 118a and the flash memory chips 118b may be the same type of flash memory chips including requiring the same voltage from the power module 114 and being from the same flash memory chip vendor. The terms vendor and manufacturer are used interchangeably throughout this document.

In another exemplary implementation, the flash memory chips 118a on the memory board 104a may be a different type of flash memory chip from the flash memory chips 118b on the memory board 104b. For example, the memory board 104a may include SLC NAND flash memory chips and the memory board 104b may include MLC NAND flash memory chips. In another example, the memory board 104a may include flash memory chips from one flash memory chip manufacturer and the memory board 104b may include flash memory chips from a different flash memory chip manufacturer. The flexibility to have all the same type of flash memory chips or to have different types of flash memory chips enables the data storage device 100 to be tailored to different applications being used by the host 106.

In another exemplary implementation, the memory boards 104a and 104b may include different types of flash memory chips on the same memory board. For example, the memory board 104a may include both SLC NAND chips and MLC NAND chips on the same PCB. Similarly, the memory board 104b may include both SLC NAND chips and MLC NAND chips. In this manner, the data storage device 100 may be advantageously tailored to meet the specifications of the host 106.

In another exemplary implementation, the memory board 104a and 104b may include other types of memory devices, including non-flash memory chips. For instance, the memory boards 104a and 104b may include random access memory (RAM) such as, for instance, dynamic RAM (DRAM) and static RAM (SRAM) as well as other types of RAM and other types of memory devices. In one exemplary implementation, the both of the memory boards 104a and 104 may include RAM. In another exemplary implementation, one of the memory boards may include RAM and the other memory board may include flash memory chips. Also, one of the memory boards may include both RAM and flash memory chips.

The memory modules 120a and 120b on the memory boards 104a and 104b may be used to store information related to the flash memory chips 118a and 118b, respectively. In one exemplary implementation, the memory modules 120a and 120b may store device characteristics of the flash memory chips. The device characteristics may include whether the chips are SLC chips or MLC chips, whether the chips are NAND or NOR chips, a number of chip selects, a number of blocks, a number of pages per block, a number of bytes per page and a speed of the chips.

In one exemplary implementation, the memory modules 120a and 120b may include serial EEPROMs. The EEPROMs may store the device characteristics. The device characteristics may be compiled once for any given type of flash memory chip and the appropriate EEPROM image may be generated with the device characteristics. When the memory boards 104a and 104b are operably connected to the controller board 102, then the device characteristics may be read from the EEPROMs such that the controller 110 may automatically recognize the types of flash memory chips 118a and 118b that the controller 110 is controlling. Additionally, the device characteristics may be used to configure the controller 110 to the appropriate parameters for the specific type or types of flash memory chips 118a and 118b.

Figure 2:
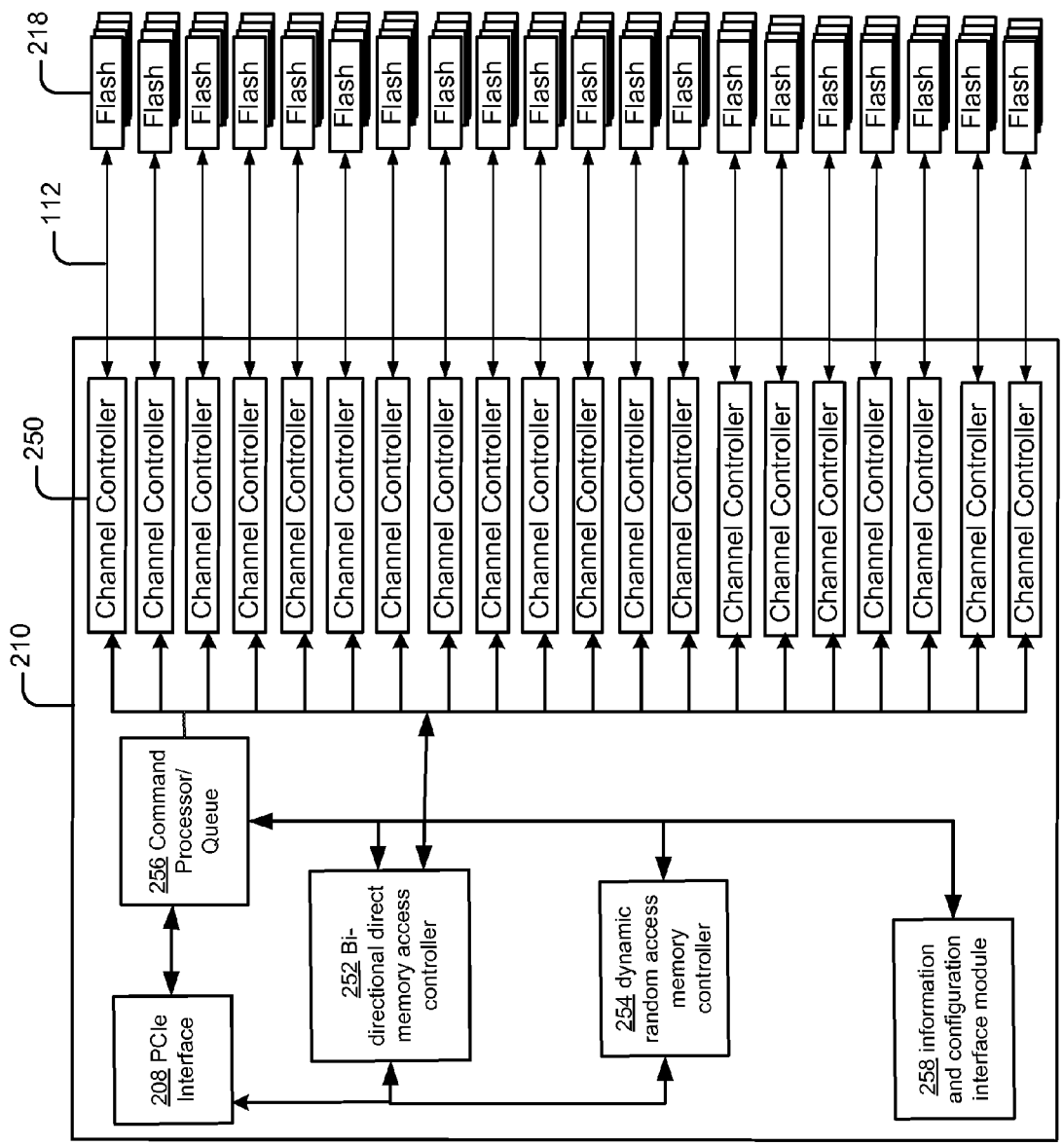
FIG. 2 is an exemplary block diagram of a FPGA controller that can be used in the data storage device of FIG. 1.

As discussed above, the controller 110 may include a FPGA controller. Referring to FIG. 2, an exemplary block diagram of a FPGA controller 210 is illustrated. The FPGA controller may be configured to operate in the manner described above with respect to controller 110 of FIG. 1. The FPGA controller 210 may include multiple channel controllers 250 to connect the multiple channels 112 to the flash memory chips 218. The flash memory chips 218 are illustrated as multiple flash memory chips that connect to each of the channel controllers 250. The flash memory chips 218 are representative of the flash memory chips 118a and 118b of FIG. 1, which are on the separate memory boards 104a and 104b of FIG. 1. The separate memory boards are not shown in the example of FIG. 2. The FPGA controller 210 may include a PCIe interface module 208, a bi-directional direct memory access (DMA) controller 252, a dynamic random access memory (DRAM) controller 254, a command processor/queue 256 and an information and configuration interface module 258.

Information may be communicated with a host (e.g., host 106 of FIG. 1) using an interface. In this example, FIG. 2, the FPGA controller 210 includes a PCIe interface to communicate with the host and a PCIe interface module 208. The PCIe interface module 208 may be arranged and configured to receive commands from the host and to send commands to the host. The PCIe interface module 208 may provide data flow control between the host and the data storage device. The PCIe interface module 208 may enable high speed transfers of data between the host and the controller 210 and ultimately the flash memory chips 218. In one exemplary implementation, the PCIe interface and the PCIe interface module 208 may include a 64-bit bus. The bi-directional direct memory access (DMA) controller 252 may be arranged and configured to control the operation of the bus between the PCIe interface module 208 and the command processor/queue 256.

The bi-directional DMA controller 252 may be configured to interface with the PCIe interface 208, and each of the channel controllers 250. The bi-directional DMA controller 252 enables bi-directional direct memory access between the host 106 and the flash memory chips 218.

The DRAM controller 254 may be arranged and configured to control the translation of logical to physical addresses. For example, in an implementation in which the host addresses the memory space using logical addresses, the DRAM controller 254 may assist the command processor/queue 256 with the translation of the logical addresses used by the host to the actual physical addresses in the flash memory chips 218 related to data being written to or read from the flash memory chips 218. A logical address received from the host may be translated to a physical address for a location in one of the flash memory chips 218. Similarly, a physical address for a location in one of the flash memory chips 218 may be translated to a logical address and communicated to the host.

The command processor/queue 256 may be arranged and configured to receive the commands from the host through the PCIe interface module 208 and to control the execution of the commands through the channel controllers 250. The command processor/queue 256 may maintain a queue for a number of commands to be executed and order the commands using an ordered list to ensure that the oldest commands may be processed first. The command processor 100 may maintain the order of the commands designated for the same flash memory chip and may reorder the commands designated for different flash memory chips. In this manner, multiple commands may be executed simultaneously and each of the channels 112 may be used simultaneously or at least substantially simultaneously.

The command processor/queue 256 may be configured to process commands for different channels 112 out of order and preserve per-channel command ordering. For instance, commands that are received from the host and that are designated for different channels may be processed out of order by the command processor/queue 256. In this manner, the channels may be kept busy. Commands that are received from the host for processing on the same channel may be processed in the order that the commands were received from the host by the command processor/queue 256. In one exemplary implementation, the command processor/queue 256 may be configured to maintain a list of commands received from the host in an oldest-first sorted list to ensure timely execution of the commands.

The channel controllers 250 may be arranged and configured to process commands from the command processor/queue 256. Each of the channel controllers 250 may be configured to process commands for multiple flash memory chips 218. In one exemplary implementation, each of the channel controllers 250 may be configured to process commands for up to and including 32 flash memory chips 218.

The channel controllers 250 may be configured to process the commands from the command processor/queue 256 in order as designated by the command processor/queue 256. Examples of the commands that may be processed include, but are not limited to, reading a flash page, programming a flash page, copying a flash page, erasing a flash block, reading a flash block's metadata, mapping a flash memory chip's bad blocks, and resetting a flash memory chip.

The information and configuration interface module 258 may be arranged and configured to interface with a memory module (e.g., memory module 116 of FIG. 1) to receive configuration information for the FPGA controller 210. For example, the information and configuration interface module 258 may receive one or more images from the memory module to provide firmware to the FPGA controller 210. Modifications to the images and to the firmware may be provided by the host to the controller 210 through the information and configuration interface module 258. Modifications received through the information and configuration interface module 258 may be applied to any of the components of the controller 210 including, for example, the PCIe interface module 208, the bidirectional direct memory access (DMA) controller 252, the DRAM controller 254, the command processor/queue 256 and the channel controllers 250. The information and configuration interface module 258 may include one or more registers, which may be modified as necessary by instructions from the host.

The FPGA controller 210 may be arranged and configured to cooperate and process commands in conjunction with the host. The FPGA controller 210 may perform or at least assist in performing error correction, bad block management, logical to physical mapping, garbage collection, wear levelling, partitioning and low level formatting related to the flash memory chips 218.

FIG. 3A is a schematic block diagram of an apparatus 300 including a data storage device 302 having a plurality of flash memory chips 318a, 318b, 318c, 318d, 318e, 318f, 318g, 318h, 318i, 318j, 318k, 318l that are organized into a first partition 321 and a second partition 322. The first and second partition 321 and 322 define different physical areas of storage space in the data storage device 302, such that directories and files of different categories can be stored in the different partitions, or so that one partition can be used for different purposes than the other partition. The first partition can include a first subset of the flash memory chips 318a-f, while the second partition can include a second subset of the flash memory chips 318g-l, where there are not any flash memory chips that are part of both partitions. That is, the boundary between the partitions 321 and 322 is drawn between individual flash memory chips to ensure that an individual flash memory chip does not belong to more than one partition.

Organizing the data storage device into two or more partitions can serve a number of purposes. For example, operating system file stored on one partition can be kept separate from user files stored on another partition. Cache and log files that can change size dynamically and rapidly, potentially making a file system full, can be stored on one partition and kept separate from other files stored on a different partition. Partitions can be used for multi-booting setups, which allow users to have more than one operating system on a single computer. For example, a user could install Linux, Mac OS X, and Microsoft Windows or operating systems on different partitions of the same data storage device and have a choice of booting into any operating system (supported by the hardware) at power-up. Partitions can be used to protect or isolate files to make it easier to recover a corrupted file system or operating system installation. For example if one partition is corrupted but none of the other file systems are affected, the data on the storage device may still be salvageable. Using a separate partition for read-only data also reduces the chances of the file system on that partition becoming corrupted. Partitions also can raise overall computer performance on systems where smaller file systems are more efficient. For example, large hard drives with only one NTFS file system typically have a very large sequentially-accessed Master File Table (MFT), and it generally takes more time to read this MFT than the smaller MFTs of smaller partitions.

In another example embodiment, the data storage device 302 may be used to store large amounts of data (e.g., many Gigabytes or Terabytes of data) that must be read quickly from the data storage device and supplied to the host. For example, the data storage device can be used to cache large volumes of publicly accessible information (e.g., a large corpus of web pages from the World Wide Web, a large library of electronic versions of books, or digital information representing a large volume of telecommunications, etc.) that can be fetched by the host in response to a query. Thus, it can be important that the relevant data be accessed and returned very quickly in response to a read command issued by the host. However, the information stored in the data storage device also may need to be constantly updated to keep the information up to date as the relevant information changes. For example, if the information on the storage device relates to a corpus of web pages, the information stored on the storage device may need to be updated as the web pages change and as new web pages are created.

In such a system, a partitioned flash memory data storage device 302 can offer exceptional performance. In a flash memory storage device, write operations to a flash memory chip take much longer (e.g., 10-100 times longer) than read operations from a flash memory chip. Therefore, organizing the chips 318a-l of the data storage device into two or more partitions, where the partitions are defined at boundaries between different chips, offers a way to ensure fast read operations while also allowing the information stored on the data storage device to be updated in real time. For example, both partitions 321 and 322 can be used to store a corpus of data (e.g., a corpus of web pages) to be served in response to queries and the individual partitions can alternate between serving the requests and being updated with new information. For instance, in a first time period the first partition 321 can be used to provide the information to the host (e.g., information that may be requested in response to a user query), while the data on the second partition 322 is updated (e.g., in response to changes or additions to the web pages of the corpus). Then, in a second time period, the recently updated second partition 322 can be used to provide the information to the host, while the data on the first partition 321 is updated. This process can be repeated so that data is always served from a partition that acts as a read-only device, and therefore provides very fast responses to read commands from the host without being slowed down by write commands, while the other partition is being updated with new information. Defining the partitions such that an individual flash memory chip is included in only one partition ensures that no flash chip will have data written to it and read from it at substantially the same time, which would cause a delay is responding to a read request from the host 350.

As discussed above, the memory chips 318a-l can be connected to a controller that may include a FPGA controller 310. The FPGA controller may be configured to operate in the manner described above with respect to controller 110 of FIG. 1 or of FPGA 210 of FIG. 2. The FPGA controller 310 may include multiple channel controllers 312a, 312b, 312c, 312d, 312e, 312f to connect the multiple channels 112 to the flash memory chips 318a-l. Of course, as described above, the storage device can include more than 12 flash memory chips, more than six channel controllers, and many more than two flash memory chips may be operably connected to a channel controller across a physical channel. Thus, the implementation shown in FIGS. 3A and 3B is merely schematic for clarity of illustration.

In one implementation, channel controllers 312a, 312b, 312c, 312d, 312e, 312f can control channels that are operably connected to flash memory chips that are part of each partition 321 and 322. For example, channel controller 312a can be operably connected to memory chip 318a, which is part of the first partition 321, and also to memory chip 318g, which is part of the second partition 322. In such a configuration, at least one memory chip in the first partition 321 is connected to each communication channel between the data storage device 302 and the host, and at least one memory chip in the second partition 322 is connected to each communication channel between the data storage device 302 and the host 350. Such a configuration results in maximum parallelism of communication between a partition 321 or 322 and the host, which can result in fast read access and fast write times from and to the data storage device 302.

In another implementation, approximately half the channel controllers can be operably connected to flash memory chips in a first partition and approximately half the channel controllers can be operably connected to flash memory chips in the second partition.

Figure 3B:
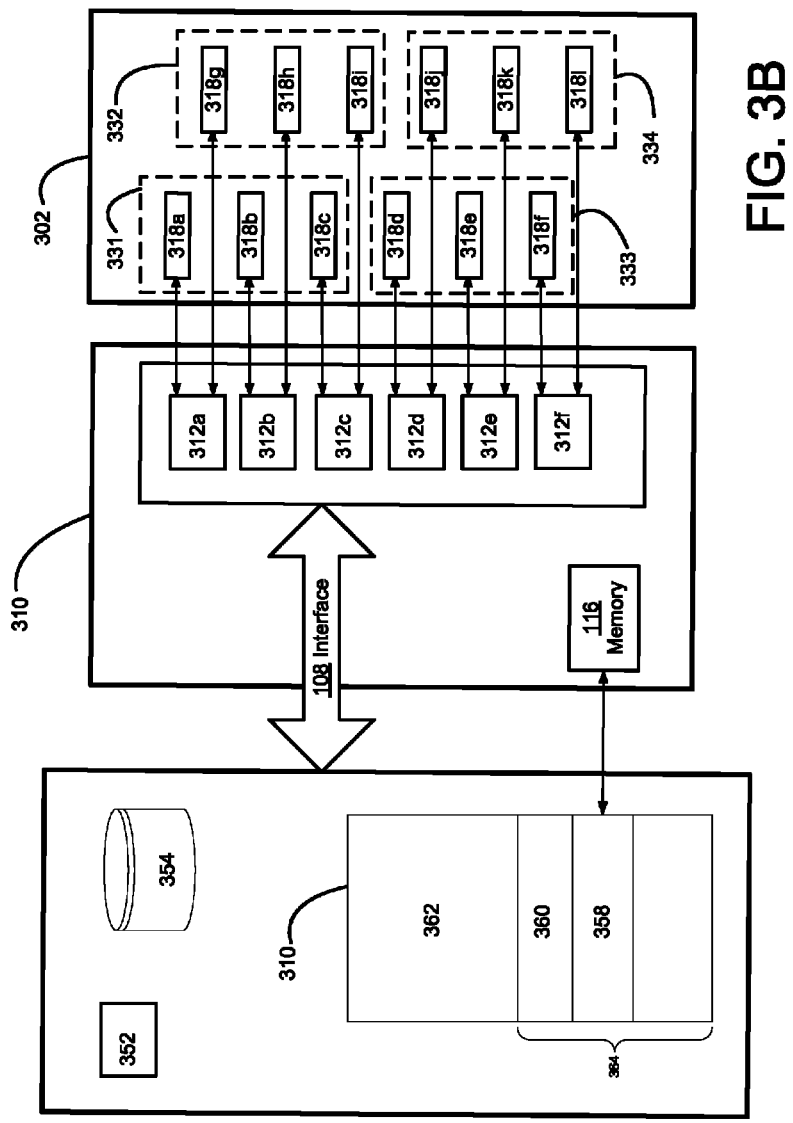
FIG. 3B is an exemplary block diagram of exemplary computing devices for use with the data storage device of FIG. 1.

In another implementation, shown in FIG. 3B, flash memory chips 318a, 318b, 318c, 318d, 318e, 318f, 318g, 318h, 318i, 318j, 318k, 318l can be organized into a first partition 331, a second partition 322, a third partition 333, and a fourth partition 334, where the different partitions define different physical areas of storage space in the data storage device 302, such that directories and files of different categories can be stored in the different partitions, or so that one partition can be used for different purposes than the other partition. The first partition 331 can include a first subset of the flash memory chips 318a-c. The second partition 332 can include a second subset of the flash memory chips 318d-f. The third partition 333 can include a third subset of the flash memory chips 318g-i. The fourth partition 334 can include a fourth subset of the flash memory chips 318j-l. Among the different partitions 331, 332, 333, and 334 there are not any individual flash memory chips whose physical memory address space is part of two or more partitions. That is, the boundaries between the partitions 331, 332, 333, and 334 are drawn between individual flash memory chips to ensure that an individual flash memory chip does not belong to more than one partition.

In the system of FIG. 3B, a partitioned flash memory data storage device 302 can offer exceptional performance, e.g., when used to store a corpus of data (e.g., a corpus of web pages) to be served in response to queries, and the individual partitions can alternate between serving the requests and being updated with new information. For instance, in a first time period the first, second, and third partitions 331, 332, and 333 can be used to provide the information to the host (e.g., information that may be requested in response to a user query), while the data on the fourth partition 334 is updated (e.g., in response to changes or additions to the web pages of the corpus). Then, in a second time period, the recently updated fourth partition 334, along with the second and third partitions 332 and 332 can be used to provide the information to the host, while the data on the first partition 331 is updated. Thus, data on each partition can be updated in round robin fashion, while query requests are served by the other partitions. This process can be repeated so that data is always served from partitions that act as read-only devices, and therefore provides very fast responses to read commands from the host without being slowed down by write commands, while the other partition is being updated with new information. Defining four partitions results in redundancy of information stored on the data storage device, so that if a partition, channel, or individual memory chip fails, such that one partition is no longer usable, the remaining three partitions can continue to be used to provide a data storage device in which each of the remaining partitions takes turns being updated while the other remaining partitions serve data requests.

As described above, the data storage device 302 can be connected to a host 350 though an interface 308, which can be a high speed interface, such as, for example a PCIe interface. The host can include, for example, a processor 352, a first memory 354, a second memory 356, and a partition engine 360. The first memory 354 can include, for example, a non-volatile memory device (e.g., a hard disk) adapted for storing machine-readable, executable code instructions that can be executed by the processor 352. The code instructions stored on the first memory 354 can be loaded into the second memory (e.g., a volatile memory, such as, a random access memory) 356 where they can be executed by the processor 352 to create the memory device detection engine 358 and the partition engine 360. The second memory can include logical blocks of "user space" devoted to user mode applications and logical blocks of "kernel space" 364 devoted to running the lower-level resources that user-level applications must control to perform their functions. The memory device detection engine 358 and the partition engine 360 can reside in the kernel space 364 of the second memory 356.

The configuration detection engine 358 can be configured to detect the number of flash memory chips 318 on the data storage device 302, and the partition engine 360 can be configured to define the first partition 321 and the second partition 322 of the data storage device. Thus, the configuration detection engine 358 and the partition engine 360, which run on the host 350, can be used by the host to discover hardware device properties of the data storage device 302 and then to define, via the host, the partitions 321 and 322. In one implementation, the configuration detection engine 358 can issue a query command to the data storage device, and in response to the query command the data storage device can return information to the host about, for example, the number of flash memory chips 318, the size (e.g., as measured in bytes) of each chip, the number of channels in the data storage device, the flash memory chips to which each the channel controller 312a-e is operably connected. Such information can be stored on the EEPROM 116 on the FPGA 310 and/or on the EEPROM 120a of the flash board of the data storage device 302. The configuration detection engine can poll the EEPROM 116 or the EEPROM 120a (e.g., during a boot-up operation of the host 350) to cause the data storage device to return such information to the host 350. In another implementation, the host may poll the flash memory chips 318 to provide the information about, for example, the number of flash memory chips 318, the size (e.g., as measured in bytes) of each chip, the number of channels in the data storage device, the flash memory chips to which each the channel controller 312a-e is operably connected.

The partition engine 360 can receive the information from the memory device detection engine 358 about the number of flash chips 318, the size of each flash chip, the number of channels and the memory chips to which each channels is operably connected, and, based on this information, the partition engine can define a first partition 321 and second partition 322 in the data storage device 302 The partition engine running on the host 350 can define the first partition to include memory blocks drawn from a first subset of the memory chips 318 and the second partition memory blocks drawn from a second subset of the memory chips 318, where the first subset does not include any individual flash chips of the second subset and the second subset does not include any individual flash chips of the first subset. The partition engine 360 then can map the physical memory block addresses (which may include, for example, a unique channel number, a unique flash memory chip number, and a block address within the flash memory chip) to logical addresses that can be used by application programs running the in the user space, such that the user space applications running on the host 350 can read data from the data storage device 302 and write data to the data storage device 302 with reference to the logical space addresses.

After a partition scheme of multiple partitions has been defined and data has been stored on the flash memory chips of the data storage device 100, the device can store information about the partitioning scheme, e.g., on the memory 116, so that the when the device is booted at a later time, it can communicate the partitioning scheme to the host 106 for the host to use. For example, the device may maintain information about the physical configuration of the data storage device, including a number of flash memory chips in the device and about the partitioning scheme, including which flash memory storage chips and channels are associated with which partitions on the memory 116. Then, when the system including the host 106 and the data storage device 100 is booted, the storage device 100 can communicate this information to the host 106, e.g., in response to a read operation performed by the configuration detection engine 358 of the host 106. The partitioning engine 360 of the host 106 then can define the partitions for the operating system and applications running on the host. For example, the partitioning engine 360 can define a first and second partition based on the information read from the storage device 100, where the first and second partitions do not include any of the same memory chips. The partitioning engine 360 also can allocate a logical to physical memory map for the first and second partitions, so that they user-level application programs can use logical addresses that then are mapped to physical memory addresses of the flash memory chips of the storage device 100.

The partition engine 360 also can be used to re-define the first partition of the data storage device to include a third subset of the plurality of flash memory chips, where the third subset is different from the first subset, and where the third subset does not include any flash memory chips of the second subset and wherein the second subset does not include any flash memory chips of the third subset. For example, with reference to FIG. 3A and FIG. 3B, a user may decide that the original partition scheme shown in FIG. 3A does not suit his or her needs, and therefore may use the host to redefine the partitions 321 and 322 (e.g., to include more or fewer flash memory chips in the particular partitions) or to add additional partitions to the scheme. In one implementation, the first partition 321 can be redefined as partitions 331 and 333. Allowing the user to define the partitions through the host rather that forcing the user to accept a partition scheme that is pre-defined by, or pre-loaded in, the controller 310 gives the user flexibility to define partitions as he or she desires and to change the partition scheme when the need arises. In another implementation, the imminent failure of one of the flash memory chips, e.g., 318a, may be detected by the host, and in response to this information, the partition engine may re-define the first partition 321 to exclude the flash memory chip 318a from the partition, i.e., as the originally defined first partition but for the memory chip 318a. Thus, any number of partitions can be defined (up to the number of flash memory chips 118a and 118b in the storage device 100), and different partitions within a partition scheme can include different numbers of flash memory chips and can include different amounts of memory space.

The host also may include an address assignment engine 366 that can exist in the kernel 364 and that can assign physical memory addresses to data to be written to the data storage device 302. For example, an application running in user space 362 may call for data to be written from the host 350 to the data storage device 302, and the user space application may specify that the data be written to a particular logical memory address. The address assignment engine 366 may translate logical addresses into physical addresses that can include, for example, a particular channel that the data should be written to, a particular flash memory chip operably connected to the specified channel to which the data should be written, and a particular physical block address of the specified memory chip to which the data should be written. In such an implementation, the translation of logical addresses to physical memory space addresses can be performed by the address assignment engine 366, such that the role of the DRAM controller 254 of the FPGA 210 is reduced or irrelevant.

Figure 4:
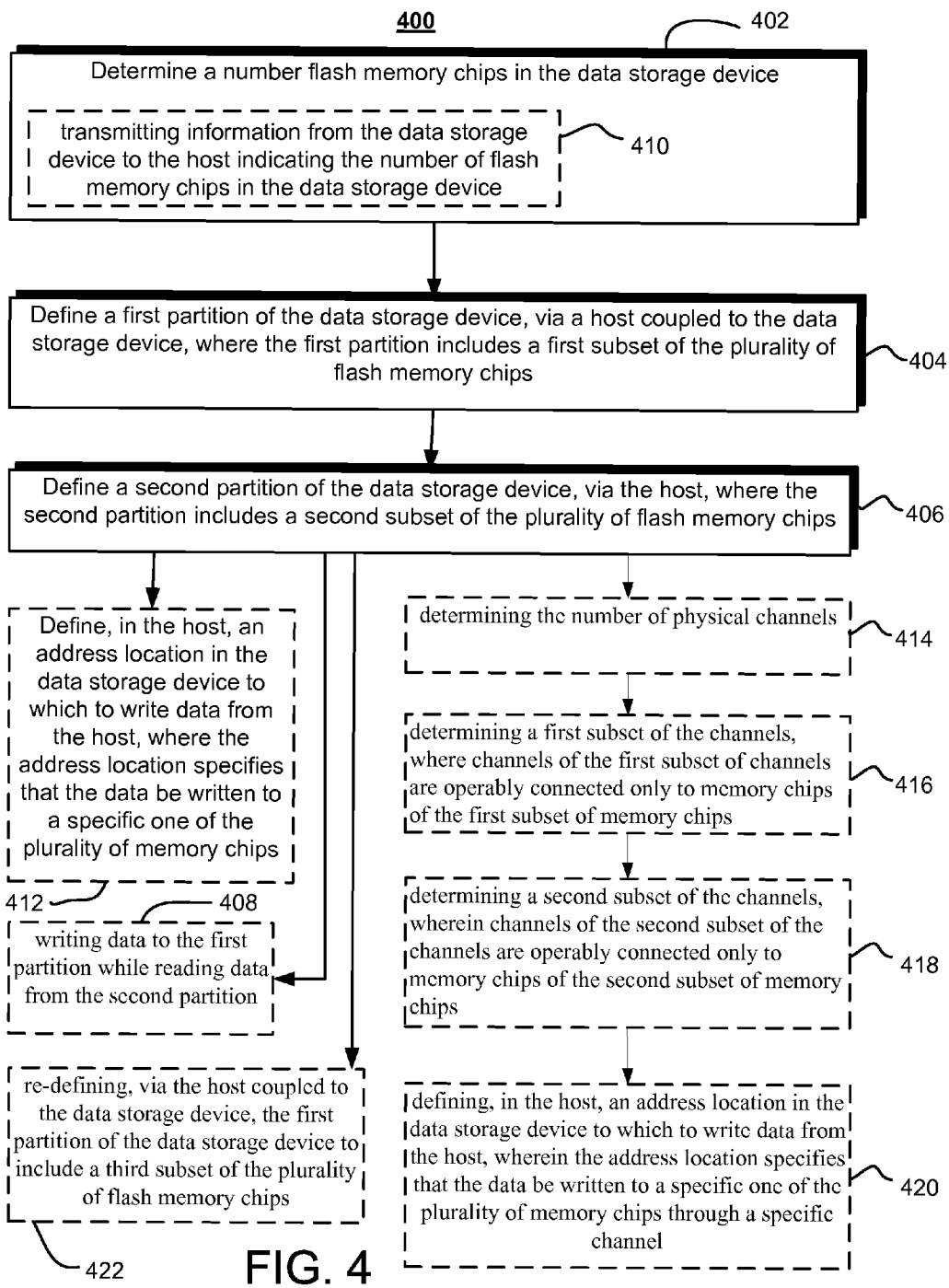
FIG. 4 is an exemplary flowchart illustrating an example process of partitioning the data storage device of FIG. 1.

FIG. 4 is an exemplary flowchart illustrating an example process 400 of partitioning the data storage device of FIG. 1, where the device includes a plurality of flash memory chips. The process 400 can include determining a number of flash memory chips in the data storage device (402). For example, the configuration detection engine can query the data storage device to gather information about the number of flash memory chips in the data storage device. A first partition of the data storage device can be defined, via a host coupled to the data storage device, where the first partition includes a first subset of the plurality of flash memory chips (404). A second partition of the data storage device can be defined, via the host, where the second partition includes a second subset of the plurality of flash memory chips (406). As a result of this process it is ensured that the first subset does not include any flash memory chips of the second subset and that the second subset does not include any flash memory chips of the first subset.

Optionally, the process 400 can include writing data to the first partition while reading data from the second partition (408). Determining the number flash memory chips in the data storage device can include transmitting information from the data storage device to the host indicating the number of flash memory chips in the data storage device (410). An address location in the data storage device to which to write data from the host can be defined in the host, where the address location specifies that the data be written to a specific one of the plurality of memory chips (412).

When the data storage device includes a plurality of physical channels for communication of data between the host and the plurality of flash memory chips, with each channel being operably connected to a different plurality of the memory chips, the process 400 can further include determining the number of physical channels (414), determining a first subset of the channels, where channels of the first subset of the channels are operably connected only to memory chips of the first subset of memory chips (416), determining a second subset of the channels, where channels of the second subset of the channels are operably connected only to memory chips of the second subset of memory chips (418), and defining, in the host, an address location in the data storage device to which to write data from the host, wherein the address location specifies that the data be written to a specific one of the plurality of memory chips through a specific channel (420). In addition, the process 400 can include re-defining, via the host coupled to the data storage device, the first partition of the data storage device to include a third subset of the plurality of flash memory chips (422).

Figure 5:
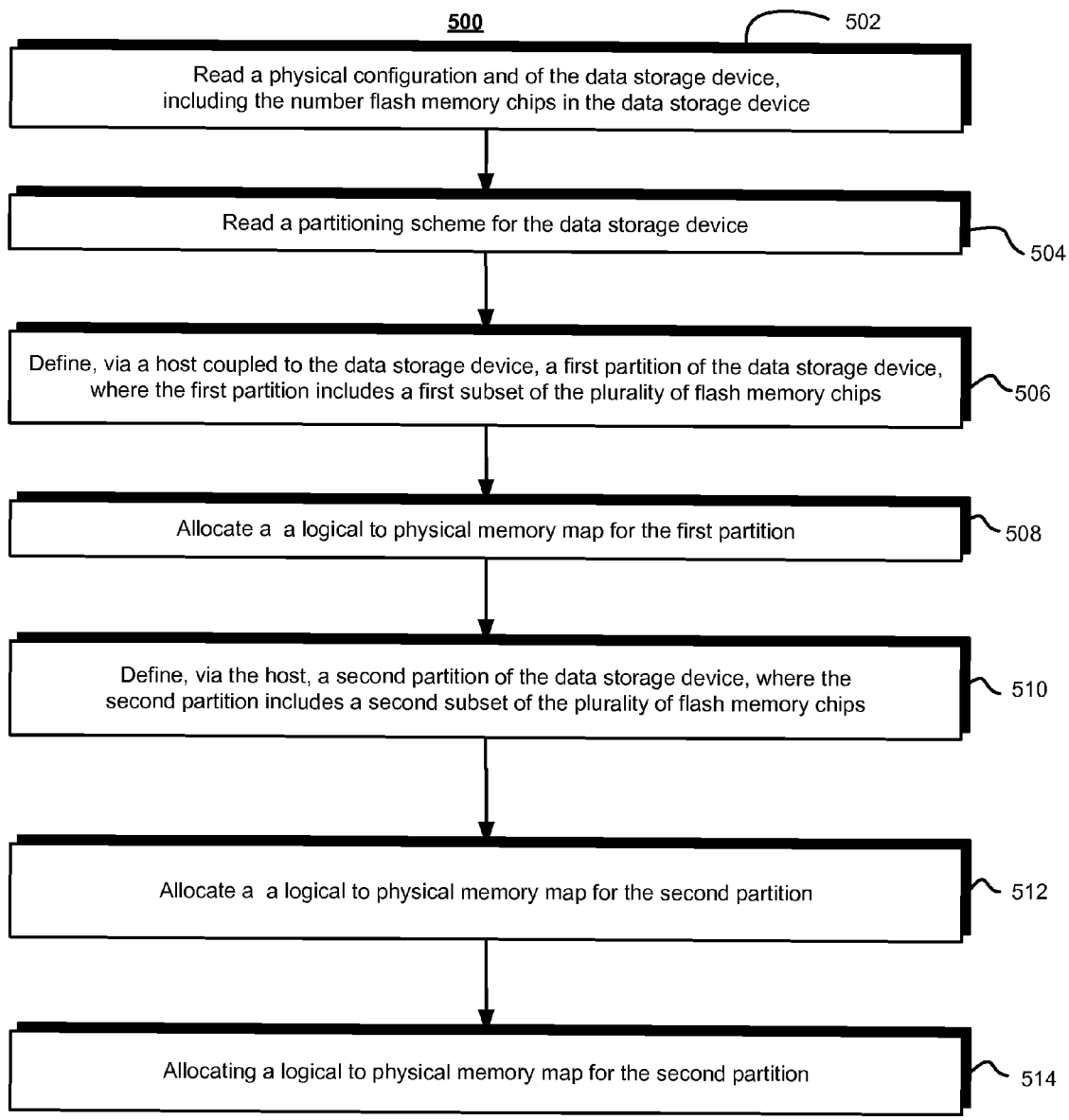
FIG. 5 is another exemplary flowchart illustrating an example process of partitioning the data storage device of FIG. 1.

FIG. 5 is another exemplary flowchart illustrating an example process 500 of partitioning a data storage device that includes a plurality of flash memory chips. The process 500 can include reading a physical configuration and of the data storage device, including the number flash memory chips in the data storage device (502). The process can also include reading a partitioning scheme for the data storage device (504). For example, the configuration detection engine can read the physical configuration and the partitioning scheme from the memory 116 of the data storage device. A host coupled to the data storage device can define a first partition of the data storage device, where the first partition includes a first subset of the plurality of flash memory chips (506), and a logical to physical memory map for the first partition can be allocated (508). The host can define a second partition of the data storage device, where the second partition includes a second subset of the plurality of flash memory chips (510) and where the first subset does not include any flash memory chips of the second subset and wherein the second subset does not include any flash memory chips of the first subset, and a logical to physical memory map for the second partition can be allocated (512).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method of partitioning a data storage device, wherein the device includes a plurality of memory chips, the method comprising:
   determining a number of memory chips in the data storage device, wherein a first portion of the plurality of memory chips is implemented in a first memory channel and a second portion of the plurality of memory chips is implemented in a second memory channel;
   defining, via a host coupled to the data storage device, a first partition of the data storage device, wherein the first partition includes a first subset of the plurality of memory chips; and
   defining a second partition of the data storage device via the host coupled to the data storage device, wherein the second partition includes a second subset of the plurality of memory chips,
   wherein:
      the first subset includes one or more memory chips of the first memory channel and one or more memory chips of the second memory channel;
      the first subset does not include any memory chips of the second subset;
      the second subset does not include any memory chips of the first subset;
      the first partition and the second partition implement different data storage areas in the data storage device; and
      a boundary between the first partition and second partition is defined by the first subset of memory chips and the second subset of memory chips.

2. The method of claim 1, further comprising writing data to the first partition while reading data from the second partition.

3. The method of claim 1, wherein determining the number of memory chips in the data storage device includes transmitting information from the data storage device to the host indicating the number of memory chips in the data storage device.

4. The method of claim 1, further comprising defining, in the host, an address location in the data storage device to which to write data from the host, wherein the address location specifies that the data be written to a specific one of the plurality of memory chips.

5. The method of claim 1, wherein the data storage device includes a plurality of physical channels for communication of data between the host and the plurality of memory chips, each channel being operably connected to a different plurality of the memory chips, the method further comprising:
  determining a number of physical channels;
  determining a first subset of the channels, wherein channels of the first subset of the channels are operably connected only to memory chips of the first subset of memory chips;
  determining a second subset of the channels, wherein channels of the second subset of the channels are operably connected only to memory chips of the second subset of memory chips; and
  defining, in the host, an address location in the data storage device to which to write data from the host, wherein the address location specifies that the data be written to a specific one of the plurality of memory chips through a specific channel.

6. The method of claim 5, wherein the first partition includes memory chips that are operably connected to a single channel.

7. The method of claim 1, further comprising:
  re-defining, via the host coupled to the data storage device, the first partition of the data storage device to include a third subset of the plurality of memory chips,
  wherein the third subset is different from the first subset, and
  wherein the third subset does not include any memory chips of the second subset and wherein the second subset does not include any memory chips of the third subset.

8. The method of claim 7, further comprising:
  receiving an indication that one of the memory chips in the first subset has failed or is approaching failure,
  wherein re-defining the first partition includes defining the third subset as the first subset of memory chips but for the memory chip that has failed or that is approaching failure.

9. An apparatus comprising:
  a data storage device including a plurality of memory chips, wherein a first portion of the plurality of memory chips is implemented in a first memory channel and a second portion of the plurality of memory chips is implemented in a second memory channel;
  a host operably coupled to the data storage device via an interface, the host comprising:
    a configuration detection engine configured to detect a number of memory chips in the data storage device; and
    a partition engine configured to define a first partition of the data storage device, wherein the first partition includes a first subset of the plurality of memory chips and to define a second partition of the data storage device, wherein the second partition includes a second subset of the plurality of memory chips,
  wherein:
    the first subset includes one or more memory chips of the first memory channel and one or more memory chips of the second memory channel;
    the first subset does not include any memory chips of the second subset;
    the second subset does not include any memory chips of the first subset;
    the first partition and the second partition implement different data storage areas in the data storage device; and
    a boundary between the first partition and second partition is defined by the first subset of memory chips and the second subset of memory chips.

10. The apparatus of claim 9, wherein the data storage device is configured to transmit, upon receiving a command from the host, information from the data storage device to the host indicating the number of memory chips in the data storage device.

11. The apparatus of claim 9, wherein the host further comprises an address assignment engine configured to assign a memory address to data to be written to the data storage device, wherein the assigned memory address specifies that the data be written to a specific one of the plurality of memory chips.

12. The apparatus of claim 9, wherein the data storage device includes a plurality of physical channels for communication of data between the host and the plurality of memory chips, each channel being operably connected to a different plurality of the memory chips,
  wherein the configuration detection engine is further configured to detect the number of channels in the data storage device,
  wherein the partition engine is further configured to define a first subset of the channels, wherein channels of the first subset of the channels are operably connected only to memory chips of the first subset of memory chips, and
  wherein the partition engine is further configured to define a second subset of the channels, wherein channels of the second subset of the channels are operably connected only to memory chips of the second subset of memory chips.

13. The apparatus of claim 12, wherein the host further comprises an address assignment engine configured to assign a memory address to data to be written to the data storage device, wherein the assigned memory address specifies that the data be written to a specific one of the plurality of memory chips through a specific channel.

14. The apparatus of claim 12, wherein the first partition includes memory chips that are operably connected to a single channel.

15. The apparatus of claim 9, wherein the partition engine is further configured to re-define the first partition of the data storage device to include a third subset of the plurality of memory chips,
  wherein the third subset is different from the first subset, and
  wherein the third subset does not include any memory chips of the second subset and wherein the second subset does not include any memory chips of the third subset.

16. The apparatus of claim 15, wherein the partition engine is further configured to receive an indication that one of the memory chips in the first subset has failed or is approaching failure; and
  wherein re-defining the first partition to include the third subset of the plurality of memory chips includes defining the third subset as the first subset of memory chips but for the memory chip that has failed or that is approaching failure.

17. A method of partitioning a data storage device, wherein the device includes a plurality of memory chips, the method comprising:
  reading a physical configuration of the data storage device, including a number of memory chips in the data storage device, wherein a first portion of the plurality of memory chips is implemented in a first memory channel and a second portion of the plurality of memory chips is implemented in a second memory channel;

reading a partitioning scheme for the data storage device;
defining, via a host coupled to the data storage device, a first partition of the data storage device, wherein the first partition includes a first subset of the plurality of memory chips;
allocating a logical to physical memory map for the first partition;
defining, via the host coupled to the data storage device, a second partition of the data storage device, wherein the second partition includes a second subset of the plurality of memory chips; and
allocating a logical to physical memory map for the first partition,
wherein:
  the first subset includes one or more memory chips of the first memory channel and one or more memory chips of the second memory channel;
  the first subset does not include any memory chips of the second subset;
  the second subset does not include any memory chips of the first subset;
  the first partition and the second partition implement different data storage areas in the data storage device; and
  a boundary between the first partition and second partition is defined by the first subset of memory chips and the second subset of memory chips.

18. The method of claim 17, further comprising writing data to the first partition while reading data from the second partition.

19. The method of claim 17, wherein the data storage device includes a plurality of physical channels for communication of data between the host and the plurality of memory chips, each channel being operably connected to a different plurality of the memory chips, wherein the physical configuration of the data storage device further includes the number of memory chips in the data storage device, the method further comprising:
  determining a first subset of the channels, wherein channels of the first subset of the channels are operably connected only to memory chips of the first subset of memory chips;
  determining a second subset of the channels, wherein channels of the second subset of the channels are operably connected only to memory chips of the second subset of memory chips; and
  defining, in the host, an address location in the data storage device to which to write data from the host, wherein the address location specifies that the data be written to a specific one of the plurality of memory chips through a specific channel.

20. An apparatus comprising:
a data storage device including a plurality of memory chips, wherein a first portion of the plurality of memory chips is implemented in a first memory channel and a second portion of the plurality of memory chips is implemented in a second memory channel;
a host operably coupled to the data storage device via an interface, the host comprising:
  a configuration detection engine configured to read a physical configuration of the data storage device, including a number of memory chips in the data storage device and configured to read a partitioning scheme for the data storage device; and
  a partition engine configured to define a first partition of the data storage device, wherein the first partition includes a first subset of the plurality of memory chips and to define a second partition of the data storage device, wherein the second partition includes a second subset of the plurality of memory chips, and configured to allocate a logical to physical memory map for the first partition and to allocate a logical to physical memory map for the second partition,
wherein:
  the first subset includes one or more memory chips of the first memory channel and one or more memory chips of the second memory channel;
  the first subset does not include any memory chips of the second subset;
  the second subset does not include any memory chips of the first subset;
  the first partition and the second partition implement different data storage areas in the data storage device; and
  a boundary between the first partition and second partition is defined by the first subset of memory chips and the second subset of memory chips.

21. The apparatus of claim 20, wherein the data storage device is configured to transmit, upon receiving a command from the host, information from the data storage device to the host indicating the physical configuration of the data storage device.

22. The apparatus of claim 20, wherein the data storage device includes a plurality of physical channels for communication of data between the host and the plurality of memory chips, each channel being operably connected to a different plurality of the memory chips,
  wherein the physical configuration of the data storage device further includes a number of channels in the data storage device,
  wherein the partition engine is further configured to define a first subset of the channels, wherein channels of the first subset of the channels are operably connected only to memory chips of the first subset of memory chips, and
  wherein the partition engine is further configured to define a second subset of the channels, wherein channels of the second subset of the channels are operably connected only to memory chips of the second subset of memory chips.

23. The apparatus of claim 22, wherein the first partition includes memory chips that are operably connected to a single channel.

* * * * *

UNITED STATES PATENT AND TRADEMARK OFFICE
CERTIFICATE OF CORRECTION

PATENT NO. : 8,639,871 B2  Page 1 of 1
APPLICATION NO. : 12/537741
DATED : January 28, 2014
INVENTOR(S) : Albert T. Borchers et al.

It is certified that error appears in the above-identified patent and that said Letters Patent is hereby corrected as shown below:

In the Claims:

In column 18, line 21, in claim 12, after "detect" delete "the" and insert -- a --, therefor.

Signed and Sealed this
Twentieth Day of May, 2014

Michelle K. Lee
*Deputy Director of the United States Patent and Trademark Office*